United States Patent Office 3,241,962
Patented Mar. 22, 1966

3,241,962
PHOTOGRAPHIC PROCESSES AND ELEMENTS
Joseph Anthony Sincius, Little Silver, N.J., assignor to E. I. du Pont de Nemours and Company, Wilmington, Del., a corporation of Delaware
No Drawing. Filed Jan. 15, 1963, Ser. No. 251,500
19 Claims. (Cl. 96—28)

This invention relates to photography and more particularly to photographic processes for the transfer of photographic images. It also relates to novel photographic elements useful with such processes.

In a conventional silver halide photographic process, a latent silver image is produced by the direct action of light or other radiation on sensitized silver halide crystals dispersed in a suitable binder. Generally, this latent image is amplified through a chemical or physical development process in order to obtain a useful image. The efficiency of a photographic system can be expressed by its quantum yield, i.e. the number of elementary reactions corresponding to one light quantum absorbed by the system. The photographic elementary process, i.e. the formation of the latent image, has a quantum yield of less than 1. The developing step increases this quantum yield to $10^6$ to $10^9$, in other words, for each light quantum absorbed in the system $10^6$ to $10^9$ silver atoms are developed in the processed image.

In assignee's U.S. application Ser. No. 86,598 filed Feb. 2, 1961 and Belgian Patent 613,385, photographic elements and processes are disclosed by means of which this quantum yield can be increased by a factor of $10^6$ to $10^8$, i.e., the total quantum yield of a photographic process of that invention can be as high as $10^{12}$ to $10^{17}$. This is accomplished by using the imagewise deposited, metallic silver of a photographic image to catalyze the polymerization of a suitable monomer in presence of a peroxygen compound. Under proper reaction conditions an amplification factor of $10^6$ to $10^8$ is obtained in the catalyzed polymerization reaction. The resulting polymeric image can be used in many processes, as disclosed in that patent application.

The process of this earlier patent application is very efficient for producing images of relatively high contrast, e.g., line and halftone images. In one embodiment a silver image is produced photographically, i.e., by exposure and processing of a silver halide photographic emulsion. This silver image is brought in intimate contact with a layer comprising a polymerizable, monomeric compound in the presence of a peroxygen compound. The silver image is oxidized by the peroxygen compound, the silver ions thus produced reacting with more peroxygen compound to produce free radicals which initiate imagewise polymerization. The probable reaction steps involved are explained in detail in the U.S. application and corresponding Belgian patent mentioned above.

The polymerization reaction of this earlier invention progresses at a superproportional rate, i.e., doubling the concentration of metallic silver more than doubles the reaction speed. Extremely low silver concentrations require therefore a relatively long reaction time, in the order of 15 to 60 minutes, whereas in presence of higher amounts of silver the reaction is completed in a few seconds or minutes. This process is therefore primarily useful in reproducing line or halftone photographic images, i.e., images consisting of substantially opaque areas and substantially transparent areas where the opaque areas are substantially of the same optical density. The reproduction of so-called continuous tone images, i.e., images having areas of various densities ranging from essentially opaque to essentially transparent, usually does not give a true copy if the image is the product of photographic underexposure. Because of the superproportional reaction rate the polymerization is complete in the areas of high silver concentration but not in those of low concentration. Because of the long reaction time, image areas of low silver concentration, i.e., low optical density, are only difficultly accessible to the reaction. Besides the loss of low density information this process also tends to increase the optical contrast of the reproduced image because of the superproportional reaction characteristic.

It is an object of this invention to provide a process to prepare photographic images of greater density by a transfer-polymerization reaction. Another object is to provide such a process which can be used with photographic, low density, continuous tone as well as process images. A further object is to provide such a process which can be carried out in a short time. Still further objects will be apparent from the following description of the invention.

The silver image transfer-polymerization process of this invention, in its broadest aspect, comprises subjecting a layer containing a developed silver image while it is in directly adjacent image transfer relationship with a stratum comprising a non-gaseous, addition polymerizable ethylenically unsaturated compound to the action of (a) a peroxygen compound addition polymerization initiator, and (b) an oxidizing agent or oxidation catalyst capable of oxidizing metallic silver to silver ions, whereby free radicals are formed and said unsaturated compound polymerizes to form an image of addition polymer corresponding to said silver image.

Where the silver image is in the same stratum as the ethylenically unsaturated compound or is in an adherent layer contiguous therewith, removal of the ethylenically unsaturated compound is accomplished by treating it with a solvent therefor, e.g., by washing or spraying and this treatment will also remove any silver salt, binding agent for the original salt or for the unsaturated compound, pigment, filler, etc. present in the non-polymerized image areas. The silver image-bearing stratum usually will be very thin and of the same order of magnitude as in a conventional photographic film having a gelatin silver halide emulsion layer (i.e., about 0.1 to 10 mils in thickness).

In the case where the silver image is in a separate photographic silver halide emulsion layer, the latter will be in contact with a solid layer comprising the ethylenically unsaturated compound on a separate support, e.g., film, plate or paper. The two layers will be in surface contact during the image transfer addition polymerization reaction.

After the polymer image is formed and the two layers are separated, the addition polymerizable compound in the non-polymer image areas can be removed by washing and/or dissolving it from said areas or it can be transferred by thermal-transfer or solvent-transfer methods to a separate image receptive support, for example one having a rough or absorptive surface. Suitable thermal transfer methods are described in assignee's U.S. Ser. No. 850,522 filed Nov. 3, 1959, U.S.P. 3,060,025, Ser. No. 839,304 filed Sept. 11, 1959, U.S.P. 3,060,024 and Ser. No. 831,700 filed Aug. 5, 1959, U.S.P. 3,060,023, all patented Oct. 23, 1962.

The non-gaseous, addition polymerizable, terminally ethylenically unsaturated compound used in the solid stratum described above may contain 1 to 4 or more terminal ethylenic groups, have a boiling point above 80° C. at atmospheric pressure, and be capable of rapidly forming an insoluble high polymer by free radical-initiated chain propagating addition polymerization in the presence of an addition polymerization initiator therefor. The unsaturated compound, preferably a monomer, may be either liquid or solid, but if liquid, a solid inorganic or organic filler material should be present in such an amount that the layer is solid. Suitable polymerizable strata and elements of this type for use in the image transfer-polymerization of the invention are described in U.S. Patents 2,760,863, 2,791,504, 2,892,716, 2,893,868, 2,902,365, 2,923,673, 2,927,022, 2,927,023, 2,929,710, 2,948,611 and 2,951,758. Suitable addition polymerizable color formers are described in U.S. Patent 3,070,422, Dec. 25, 1962.

When the final polymer image-bearing element is to be used in a thermal image transfer process the solid stratum should be solid below 40° C. and thermally transferable by having a stick or transfer temperature above 40° C. and below 220° C. and comprise (a) a thermoplastic organic polymer solid at 50° C. and (b) an ethylenically unsaturated compound containing at least one terminal ethylenic group having a boiling point above 100° C. at normal atmospheric pressure, being capable of rapidly forming a high polymer by free radical initiated addition polymerization, as stated above, and also having a plasticizing action on said thermo-plastic polymer; said constituents (a) and (b) being present in amounts from 3 to 97 and 97 to 3 parts by weight respectively. Any of the elements and thermoplastic polymers given in U.S.P. 3,060,023, can be used for the silver image transfer addition polymerization processes of the present invention.

According to a preferred aspect of the invention, a radiation-sensitive photographic element having a light-sensitive colloid-silver halide emulsion layer is exposed, imagewise, to radiation to produce a latent silver image and developed in a silver halide developing solution. The exposure is carried out to such an extent that the developed image is discernible above the normal fog level but the layer may still be substantially underexposed. The exposed layer is then brought into contact with the polymerizable layer of a separate polymerizable element containing water, a peroxygen compound, particularly a persulfate compound, and a suitable oxidizing agent capable of catalyzing the oxidation of silver.

Useful catalysts for the process of this invention are oxidizing agents. The preferred catalysts are ferric salts. It is believed the ferric ions oxidize the metallic silver to silver ions and simultaneously become reduced to ferrous ions. It is then thought the silver ions react with the peroxygen compound to give free radicals that induce polymerization of the monomeric compound. The ferrous ions generated during the reaction, in turn, probably react with the peroxygen compound producing free radicals and ferric ions.

The process is preferably carried out by applying a transfer solution to a surface of one of the two layers, i.e., the silver image-bearing layer or the photopolymerizable layer. This transfer solution will generally contain water, a peroxygen initiator, a catalyst, an acid to lower the pH below 8, preferably below 7, and preferably, a thickening agent to increase the viscosity of the solution and to facilitate spreading of the solution uniformly over the entire transfer area. Solutions having a viscosity of 10 to 300 centipoises are particularly useful. The thickening agents used in adjacent layer or contact development of exposed silver images to form developed silver images in separate silver halide layers are useful in the transfer solutions. Polyethylene oxide, methyl cellulose, ethyl cellulose, hydroxyethyl cellulose, polyvinyl alcohol, polyvinyl pyrrolidone, glycerine, and ethylene glycol, diethylene glycol and their derivatives are useful thickening agents.

In carrying out the process of this invention, an enormous increase in quantum yield of the image is obtained. This increase is quite unexpected because the main amplification reaction which takes place in other processes takes place only in a solution system under ideal conditions, whereas the process of this invention embodies a solid, image-forming system. The process of this invention is designated as a catalyzed silver image-transfer polymerization process because a polymerization reaction is initiated by diffusion of silver ions into the sites of polymerization, and while the theory of the reaction has not been fully established, the results might be explained, where a persulfate is used as the peroxygen compound and alkyl acrylate as the unsaturated monomer, by having the following series of schematic equations:

(1) $$AgBr \xrightarrow{\text{light and development}} Ag° \text{ (image)}$$

(2) $$Ag° \text{ (image)} + S_2O_8^{-2} \xrightarrow{H^+} Ag^{+1} + 2SO_4^{-2}$$

(3) $$Ag^{+1} + S_2O_8^{-2} \rightarrow Ag^{+2} + SO_4^- + SO_4^{-2}$$

(4) $$Ag^{+2} + H_2O \rightarrow Ag^{+1} + \cdot OH + H^+$$

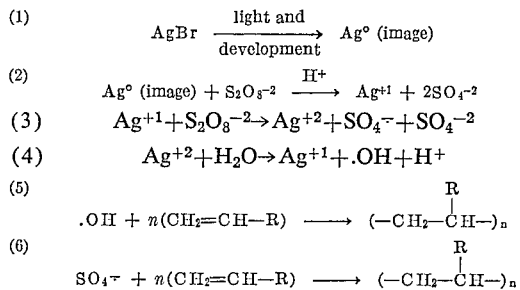

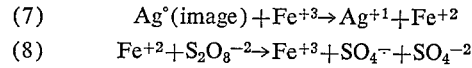

where R is an organic radical which may contain additional unsaturated groups.

A catalyst, e.g., a ferric salt, increases the amount of polymer according to the following additional reactions:

(7) $$Ag°(\text{image}) + Fe^{+3} \rightarrow Ag^{+1} + Fe^{+2}$$

(8) $$Fe^{+2} + S_2O_8^{-2} \rightarrow Fe^{+3} + SO_4^- + SO_4^{-2}$$

The silver ions obtained by reacting metallic silver with ferric ions (Reaction 7) enter into Reaction 3 to produce additional free radicals. The ferrous ions of Reaction 8 react with persulfate ions to produce still more free radicals (Reaction 8). It should be noticed that the ferrous ions are oxidized to ferric ions in this last reaction and made available for another reaction with silver (Reaction 7). The ferric salt is therefore a true catalyst and is not consumed. Since both reaction products of Reaction 7 produce free radicals the addition of the ferric ion catalyst increases the quantum yield of the whole process by a factor of 2. A similar sequence of reactions is believed to take place with other peroxygen compounds and other catalysts.

In a simple application of the process, a low density silver image produced by underexposing a photographic silver halide layer to light and by conventional processing (Equation 1) is brought in contact with a layer containing vinyl monomer, a binder, a persulfate and a catalyst capable of oxidizing the metallic silver, forming silver ions and free radicals. After separating the two layers and washing out the unpolymerized areas, a polymer image corresponding to the original underexposed silver image is obtained in the second layer.

In the process, the persulfate ion migrates to the silver image and converts it to silver ion (Equation 2) which, in turn, migrates back to the polymerizable element and decomposes the persulfate in the presence of the vinyl monomer (Equations 3 and 4). The free radicals thus produced initiate the polymerization of the monomer (Equations 5 and 6). In addition, the ferric ions also migrate to the silver image and convert an additional amount of silver to silver ions (Equation 7). The silver ions and the ferrous compound migrate back to the polymerizable element and react with the persulfate according to Equations 3 and 8 to produce additional free radicals.

It is suprising that the reactions (Equations 2–8) which involve rate determining diffusion steps can be completed in a matter of seconds at room temperature.

The invention also provides new products, one of which is an image-forming element comprising a sheet support bearing on its surface a solid layer or stratum as described above containing the non-gaseous, addition polymerizable terminally unsaturated compound and a polymeric binding agent as the sole image-forming material, and a catalyst capable of oxidizing metallic silver to silver ions.

Another useful product of the invention comprises a support bearing a layer comprising the polymeric binder and the non-gaseous unsaturated compound as the sole image-forming material, the catalyst and the peroxygen compound.

Many variations of the basic process outlined above are possible. A number of such variations are covered by the following examples, others will be apparent to those skilled in the art. Therefore, these examples only serve to illustrate, but in no way to limit the scope of this invention.

*Example I*

An indoor scene was photographed using a commercially available film having an ASA speed rating of 125. The correct exposure for this film under available room light was determined with an incident light meter and found to be $\frac{1}{25}$ second at a diaphragm opening of $f/2.5$. However, the actual exposure was made at $\frac{1}{50}$ second and $f/22$. This would be the correct exposure for a film speed rating of approximately ASA 20,000. After usual development and fixing, a weak, low-contrast photographic negative was obtained having a maximum density of 0.05 above fog. Attempts to prepare positive contact prints from this negative resulted in indistinct, low contrast prints of unacceptable quality.

The photographic negative was then lightly brushed with a solution composed of 25 ml. of a 2% aqueous solution of polyethylene oxide (average molecular weight about 100,000, viscosity of a 5% aqueous solution at 25° C. of 225–375 centipoises), 2.5 ml. of 2-molar sulfuric acid and 5 ml. of a 0.1-molar, aqueous solution of ferric ammonium sulfate thus providing a molar concentration of ferric ions equal to about $1.5 \times 10^{-2}$. The so treated negative was then contacted with a polymerizable transfer coating prepared from the following solution:

| | |
|---|---|
| 8% gelatin in 20% aqueous methanol _____ml__ | 25 |
| 5% aqueous lauryl alcohol sulfate (Na salt) __ml__ | 5 |
| Potassium persulfate _____g__ | 0.2 |
| o-Methacrylamidophenol (cyan color former monomer), with 2% solution in ethanol _____ml__ | 1.0 |
| Polyethyleneglycol diacrylate _____g__ | 2.0 |

This solution was coated at about 35° C. on polyethylene terephthalate film support to give a dry coating thickness of about 0.005 inch. The film support was made according to Alles et al. U.S. Patent 2,637,088 and Alles U.S. Patent 2,779,684, having a resin substratum of vinylidene chloride/acrylic ester/itaconic acid copolymer and, over this coating, a gelatin substratum (0.5 mg./dm.²).

The negative and the polymerizable transfer layer were brought into intimate contact by passing the two sheets between rollers under a slight pressure. After 5 minutes of contact, the two sheets were separated. A polymeric, negative image corresponding to the silver image was clearly visible in the transfer sheet due to differences in the index of refraction corresponding to the degree of polymerization. It should be noted that no light exposure was used to effect the transfer polymerization.

The imagewise polymerized transfer film was then washed for one minute in a solution of 3 parts of ethanol and 1 part of water to remove the unpolymerized cyan color former. The polymeric colorless, image was then "developed" with an alkaline solution of p-aminodiethylaniline containing potassium ferricyanide. A continuous tone, cyan image, corresponding to the silver image was obtained. The optical density and contrast were much higher than in the underexposed silver image, the maximum density being 1.6 above fog. Contact prints on panchromatic photographic paper were of a quality comparable to that obtained from a correctly exposed negative.

This experiment was repeated with a similar, underexposed negative and with the same polymerizable transfer film, but the ferric salt was omitted from the transfer solution. After 5 minutes contact time, no polymer image was produced on the transfer film. Washout of unpolymerized color former and color development resulted in a clear, colorless film. By increasing the contact time to one hour and the temperature from ambient (about 22° C.) to 45° C. a partial cyan polymer image could be produced. However, the lowest density areas of the negative were not reproduced.

*Example II*

The process of Example I was repeated, except that $1.5 \times 10^{-2}$ molar cupric sulfate was used in the transfer solution instead of the iron salt. After 5 minutes contact time, a polymer image was produced in the transfer coating, clearly visible because of differences in refractive index corresponding to the degree of polymerization.

*Example III*

Example I was repeated except that $1.5 \times 10^{-2}$ molar ceric sulfate was used in the transfer solution instead of the iron salt. A five-minute contact time was sufficient to produce a polymeric image in the transfer layer by transfer polymerization.

*Example IV*

Example I was repeated, using potassium dichromate ($1.5 \times 10^{-2}$ molar) instead of ferric ammonium sulfate in the transfer solution. A 5 minute silver transfer polymerization resulted in a polymeric image in the transfer layer.

*Example V*

The following solutions were prepared:

| | |
|---|---|
| (A) 8% gelatin in 20% aqueous methanol ___ml__ | 300 |
| 10% aqueous lauryl alcohol sulfate (Na salt) _____ml__ | 60 |
| (B) Polyethyleneglycol diacrylate _____g__ | 24 |
| o-Methacrylamidophenol _____g__ | 4.5 |
| Ethanol _____ml__ | 20 |
| (C) Tetrasodium ethylenediamine tetraacetate, 0.1 molar aqueous solution _____ml__ | 12 |
| Ferric ammonium sulfate, 0.5 molar aqueous solution _____ml__ | 2.4 |
| Water _____ml__ | 75 |

A coating composition was prepared as follows:

2.4 g. potassium persulfate were dissolved in solution (A). Solutions (B) and (C) were then added with stirring. This composition was coated on a film support as explained in Example I to form a transfer film.

A commercially available, high speed, panchromatic negative film was exposed through a step wedge having 20 steps, the wedge characteristic being $\sqrt{2}$, to an electronic flash of 1/10,000 second duration. The film was processed as recommended by the manufacturer to give a negative image of the step wedge.

A silver transfer polymerization was then performed by contacting the silver negative with a transfer film described above. No transfer solution was used, but the silver negative was bathed in a 0.4 molar aqueous sulfuric acid solution for one minute prior to contact. The two films were held in contact for 2 minutes. Upon separation of the two sheets, a polymer image was clearly visible in the transfer film. After elimination of the unreacted monomeric compound and color devlopment of the polymer, as in Example I, a high contrast, cyan colored image was obtained. The improvement in density and contrast as compared to the original silver image is evident from the following table. The densities were measured in filtered light having a peak wavelength of 640 mμ.

| Step No. | Net density | | Step No. | Net density | |
|---|---|---|---|---|---|
| | Silver image | Polymer image | | Silver image | Polymer image |
| 1 | 0 | 0 | 11 | 0.31 | 3.39 |
| 2 | 0 | 0 | 12 | 0.43 | 3.39 |
| 3 | 0 | 0.06 | 13 | 0.51 | 3.39 |
| 4 | 0 | 0.12 | 14 | 0.58 | 3.39 |
| 5 | 0.01 | 0.23 | 15 | 0.68 | 3.39 |
| 6 | 0.02 | 0.53 | 16 | 0.77 | 3.39 |
| 7 | 0.04 | 1.47 | 17 | 0.86 | 3.39 |
| 8 | 0.08 | 2.99 | 18 | 0.93 | 3.39 |
| 9 | 0.12 | 3.24 | 19 | 1.01 | 3.39 |
| 10 | 0.20 | 3.32 | 20 | 1.11 | 3.39 |

A similar silver transfer polymerization with a duplicate negative and a transfer coating containing no ferric ion catalyst, but using the same contact time, yielded a clear film with no image.

*Example VI*

The following solutions were prepared:

|  | ml. |
|---|---|
| (A) 8% gelatin in 20% aqueous methanol | 100 |
| 5% aqueous solution of lauryl alcohol sulfate (Na salt) | 40 |
| (B) Tetrasodium ethylenediamine tetraacetate, 0.1 molar aqueous solution | 30 |
| Ferric ammonium sulfate, 0.5 molar aqueous solution | 5 |
| Water | 50 |
| (C) Chrome alum, 1% aqueous solution | 15 |
| Water | 25 |

A polymerizable transfer coating was prepared as in Example I and overcoated with a thin layer of the solution obtained by mixing solutions (A), (B) and (C) together. A silver transfer polymerization, using the negative and technique of Example V, was made. A cyan colored image of comparable quality to that of Example V was obtained.

*Example VII*

A dilute, aqueous carbon black dispersion was prepared according to a process described in U.S. Patent 2,581,414 by rapidly stirring 52 gms. of a 40% aqueous dispersion of carbon black having an average particle size of 41 mμ., 340 ml. of distilled water and 340 grams of 20–30 mesh Ottawa sand as referred to in A.S.T.M. specification C–190. After 5 minutes of stirring at room temperature in a stainless steel can of approximately 1500 ml. capacity the sand was separated from the mixture by filtration through a layer of felt of about 1/16 inch thickness.

A 40 ml. portion of the filtrate was added to 400 ml. of a solution containing 8% of photographic grade gelatin and 20% of methanol, kept at 30 to 40° C., and 15 ml. of a 5% aqueous solution of a surface active agent (the sodium salt of technical lauryl alcohol sulfate), were added to the gelatin-carbon dispersion.

A coating solution was prepared as follows:

| | |
|---|---|
| Gelatin-carbon dispersion ml | 100 |
| Water ml | 100 |
| Polyethylene glycol diacrylate g | 6.65 |

This coating solution was coated at about 35° C. on polyethylene terephthalate film support as described in Example I to give a dry coating thickness of about 0.005 inch. A light seenstive lithographic silver halide emulsion in which the AgCl/AgBr ratio was 7:3 was coated over this layer, so that the coating weight was approximately 35 mg. of silver halide per dm.$^2$. This emulsion coating was performed in red light in order not to fog the light sensitive, photographic layer. After drying, the silver halide layer was exposed through a photographic line negative to yield a faint silver image after developing in an aqueous "Amidol" (diaminophenol) developer and fixing in a non-hardening fixer. After washing, the element was placed for one minute in an aqueous solution with the following composition

| | |
|---|---|
| Potassium persulfate | 0.1 molar. |
| Sulfuric acid | 0.1 molar. |
| Ferric ammonium sulfate | $2.5\times10^{-4}$ molar. |

After washing for 3 minutes in water of 40° C. to remove the unpolymerized areas, an opaque, black pigmented polymer image corresponding to the silver image area was obtained.

A similar pigmented polymer image was obtained when the above fixing step was omitted.

A similar experiment in which the ferric ion was absent in the treating solution yielded complete washout of binder and no polymer image.

The foregoing examples are merely illustrative. Many other elements and conditions can be employed e.g., the elements and processing conditions of assignee's copending application Cohen Ser. No. 86,598 filed Feb. 2, 1961 can be adapted by the addition of the described oxidizing agents to the polymerizable layers or transfer solutions described therein to achieve the advantages of the present invention. Such adaptation is particularly useful with weak, low contrast, silver images such as those resulting from underexposure.

In the foregoing examples, the polyethylene glycol diacrylate used was a mixture of diacrylates of polyethylene glycols containing an average of 8 ether groups.

A suitable binder for the polymerizable layer is gelatin, but for some applications other binders are advantageous. The binder used should be permeable to the solvent used for the solution of the peroxygen compound. Thus, in the preferred system, water-permeable binders such as polyvinyl alcohol, polyacrylamide, polyvinyl pyrrolidone, cellulose acetate succinate, polyethylene oxides, bone glue, agar-agar, methyl cellulose, or copolymers of hydrophobic vinyl monomers with hydrophilic monomers such as acrylic acid, acrylamide, sodium styrene sulfonate, etc., or certain nylons that are soluble in aqueous systems, for example the alkoxymethyl polyamides and the compounds disclosed in Burg, U.S. Patent No. 3,043,805, July 10, 1962, can be used. Where water-insoluble peroxides are used, such as benzoyl peroxide in ethanol, the process operates best with binders which are alcohol-permeable such as cellulose acetate or cellulose acetate butyrate, polyvinyl acetate, polyvinyl butylral, ethylcellulose, certain nylons, etc. The selection of the binder depends to some degree on the method of development. Thus, if the image is to be devolped by water washout, the binder should be soluble in water or for alcohol washout, in alcohol. Where development is by thermal transfer, a preferred binder monomer combination should have a reasonably low softening point. It is even possible to use no binder at all, by selecting a monomer which in itself is film forming.

The polymerization reaction of this invention depends on imagewise distributed silver ions. Generally, these silver ions are formed in situ by reacting a peroxygen compound or a suitable catalytic oxidizing agent with a metallic silver image. Any type of light sensitive silver salt system can be used to produce the original silver image, for example, ordinary photographic emulsions containing silver chloride, silver bromide, silver iodide or mixtures thereof of structures containing other light sensitive silver salts, like silver oxalate, silver acetylide, silver azide, etc. They can be sensitive to various radiations, like visible light, ultraviolet or infrared radiation, X-rays, alpha-, beta-, or gamma-radiation, etc., or to mechanical deformations like pressure.

Any polymerizable vinyl compound that is soluble or dispersible in water or in a solvent, for example in ethanol, methanol, acetone, etc., can be used. Such vinyl monomers are, for example, acrylic acid, methacrylic acid, acrylamide, methacrylamide, methyl acrylate, ethyl acrylate methyl methacrylate, vinyl acetate, methyl vinyl ketone, 2-methyl-5-vinyl pyridine, styrene, etc. Also, alkylene or polyalkylene glycol diacrylates prepared from alkylene glycols of 2 to 15 carbon atoms or polyalkylene glycols of 1 to 10 ether linkages, and those disclosed in Martin & Barney, U.S. Patent 2,927,022, issued March 1, 1960, e.g., those having a plurality of addition polymerizable ethylenic linkages particularly when present as terminal linkages and especially those wherein at least one and preferably most of such linkages are conjugated with a doubly bonded carbon, including carbon doubly bonded to carbon and to such heteroatoms as nitrogen, oxygen and sulfur. Outstanding are such materials wherein the ethylenically unsaturated groups, especially the vinylidene groups, are conjugated with ester or amide structures. The following specific compounds are further illustrative of this class:

Unsaturated esters of polyols, particularly such esters of the alpha-methylene carboxylic acids, e.g., ethylene diacrylate, diethylene glycol diacrylate, glycerol diacrylate, glycerol triacrylate, ethylene dimethacrylate, 1,3-propaneidol dimethacrylate, 1,2,4-butanetriol trimethacrylate, 1,4-cyclohexanediol diacrylate, 1,4-benzenediol dimethacrylate, pentaerythritol di-, tri- and tetraacrylate, pentaerythritol, di-, tri- and tetramethacrylate, 1,3- propanediol diacrylate, 1,5-pentanediol dimethacrylate, the bis-acrylates and methacrylates of polyethylene glycols of molecular weight 200–500, and the like; unsaturated amides, particularly those of the alpha-methylene carboxylic acids, and especially those of alpha, omega-diamines, such as methylene bis-acrylamide, methylene bis-methacrylamide, ethylene bis-methacrylamide, 1,6-hexamethylene bis-acrylamide, diethylene triamine tris-methacrylamide, bis (gamma-methacrylamidopropoxy)ethane, beta-methacrylamido-ethyl methacrylate, N-(beta-hydroxyethyl)-beta-methacrylyloxyethyl)acrylamide; vinyl esters such as divinyl succinate, divinyl adipate, divinyl phthalate, divinyl terephthalate, divinyl benzene-1,3-disulfonate, and divinyl butane, 1,4- disulfonate; acrylate salts, such as calcium acrylate, magnesium acrylate, etc.; and unsaturated aldehydes, such as sorbaldehyde (hexadienal).

The polymerization initiator is a peroxygen compound. Peroxygen compounds can be characterized by the presence of an oxygen to oxygen bond. The class includes compounds such as peroxides, superoxides, peroxide-superperoxides, peroxy acids and their salts and peroxyhydrates. Organic peroxygen compounds representing organic groups by R and R' include hydroperoxides of the general structure ROOH such as saturated aliphatic hydroperoxides, hydroperoxides of olefins, aralkyl hydroperoxides, dialkyl and diaralkyl peroxides of the general structure ROOR', aromatic and aliphatic peroxyacids of the general structure $RC(=O)OOH$ and their salts, peroxyesters of the structure $RC(=O)OOR'$, diacyl and diaroyl peroxides of the general structure $$RC(=O)OO(O=)CR'$$

peroxy derivatives of aldehydes, ketones, ethers, phenylhydrazones and the peroxide products obtained by the oxidation of phenolic and enolic compounds and by dehydrogenation of certain phenols and acids. The preparation, properties and structural classification of peroxygen compounds are well known, see e.g. Moeller, "Inorganic Chemistry," John Wiley and Sons Inc., New York, 1952; Machu "Das Wasserstoffperoxyd und die Perverbindunger," Verlag von J. Springer, Wien, 1937 and Tobolsky and Mesrobian "Organic Peroxides," Interscience Publishers Inc., New York, 1954. Potassium persulfate is the preferred initiator, but other peroxygen compounds are useful, for example, sodium and ammonium persulfate, hydrogen peroxide, benzoyl peroxide, succinic acid peroxide, t-butyl hydroperoxide, sodium perborate, and others.

The reaction catalyst is a compound capable of oxidizing metallic silver to silver ions while being reduced to a lower oxidation state. The lower oxidation state reacts with the peroxygen compound to form a free radical and the higher oxidation state which is now available for a new reaction cycle. Suitable catalyst are metal salts that are relatively stable in a higher and a lower oxidation state and are capable when in the higher oxidation state, of oxidizing metallic silver to silver ions. Compounds of this type are, e.g., ferric, cupric, ceric salts, dichromates, permanganates, etc. The silver salt or complex formed should preferably bet a soluble one so that it can diffuse from the silver image layer to the polymerizable layer. Many oxidizing agents, such as the ferricyanides, give insoluble silver salts and are therefore not preferred. They could be used, however, in systems comprising a solvent for these salts, e.g., sodium thiosulfate or potassium cyanide.

The polymerization reaction is initiated by contacting the polymerizable layer with a silver image layer in the presence of a peroxy initiator and a catalyst in an acid medium. Preferably, a transfer solution is used which greatly facilitates the ionic diffusion from one layer to the other. However, slightly dampening one layer with the acid solution is sufficient to produce the reaction.

Any acid can be used that has no detrimental side effect. Suitable acids are, e.g., sulfuric, acetic, formic, propionic, etc. Some acids like hydrochloric or nitric are not preferred because they form insoluble silver salts or they can attack the monomer or the polymer formed in the process.

Many peroxy compounds, however, undergo a hydrolytic dissociation in an aqueous solution which lowers the pH of the solution below the neutral point. In these cases, the initiation reaction takes place in absence of any additional acid. The typical initiators of this type are the persulfates. It should be noted, that the reaction rate with these initiators, too, is greatly increased by additional acid.

The initiator, or the catalyst, or both can be added to the transfer solution. This eliminates any premature decomposition of the highly reactive initiator and therefore increases the shelf life of the polymerizable layer.

Preferably, the transfer solution contains a thickening agent such as polyethylene oxide, polyvinyl alcohol, agar-agar, etc.

The transfer time should not be prolonged beyond the time necessary to produce a satisfactory polymeric image. Unduly long transfer times can lead to reduced resolution and poor picture quality because of lateral diffusion. For the same reasons, the thickness of the polymerizable layer should be kept at a minimum.

The utility of the processes and products of this invention have been described in the foregoing text and especially in the examples. The invention, however, is not limited to merely increasing the quantum image yield from developed silver images but, as will be apparent to those skilled in the photographic and related arts, is useful for many other practical purposes. For example, the process of the invention can be used in the preparation of lithographic printing plates which are characterized by exceedingly shallow reliefs and by having ink-receptive and ink-repellent areas. By having both hydrophobic materials and hydrophilic materials in respective areas lithoplates can be made. The invention is useful in preparing halftone and line letterpress printing plates as well. Plate production is greatly simplified by the invention. In addition, greater speeds are possible because no photographic exposure of the polymerizable plate is necessary.

The process of the invention can be used to prepare resist images for screen printing, for etching, for the preparation of printed circuits, etc. Satisfactory off-set plates can be prepared from silver images. Still other advantages will be apparent from the foregoing description of the invention.

An advantage of this invention is that it is simple yet highly dependable, and the process thereof is rapid, giving high quality permanent images. Another advantage is that weak silver images can be readily transferred to form strong contrasting images in a separate element.

I claim:
1. A silver image transfer-polymerization process which comprises subjecting at a pH of below 8.0
   (1) a preformed silver image-bearing layer wherein the only inorganic image-forming material is silver-containing material, and
   (2) a solid layer containing a non-gaseous addition polymerizable ethylenically unsaturated compound
while said layers are in contact to the simultaneous action of
   (A) a peroxygen compound addition polymerization initiator, and
   (B) a melt salt oxidation catalyst free from oxygen-to-oxygen bonds, relatively stable in higher and lower oxidation states and capable of oxidizing metallic silver to silver ions,
and maintaining said layers in surface contact until an image of addition polymer corresponding to said silver image forms in layer (2).

2. A process according to claim 1 wherein said unsaturated compound is monomeric.

3. A process according to claim 1 wherein said solid stratum is on a flexible support.

4. A process according to claim 1 wherein said separate solid stratum contains a colorant.

5. A process according to claim 1 wherein said peroxygen compound is a persulfate.

6. A process according to claim 1 wherein said oxidation catalyst is a water-soluble ferric salt.

7. A process according to claim 1 wherein said oxidation catalyst is a water-soluble cupric salt.

8. A process according to claim 1 wherein said oxidation catalyst is a water-soluble ceric salt.

9. A process according to claim 1 wherein said solid layer comprises
   (A) an organic polymer binding agent solid at 50° C., and
   (B) an ethylenically unsaturated monomer containing at least one terminal ethylenic group, having a boiling point above 80° C. at normal atmospheric pressure and being capable of forming a high polymer by free radical initiated, chain propagating addition polymerization;
wherein constituents A and B are present in amounts from 3 to 97 and 97 to 3 parts by weight, respectively.

10. A process according to claim 1 wherein a transfer solution containing the oxidation catalyst is applied to the layer (1).

11. A process according to claim 1 wherein the silver image is a developed silver image.

12. A silver image transfer process which comprises treating the surface of at least one of the following layers
   (1) a preformed developed silver image-bearing layer wherein the only inorganic image-forming material is silver-containing material, and
   (2) a solid layer containing a non-gaseous addition polymerizable ethylenically unsaturated compound,
      (a) by applying a transfer solution having a pH below 8 and comprising water, a peroxygen compound and an oxidation catalyst capable of oxidizing metallic silver to silver ions,
      (b) maintaining said layers in surface contact until an image corresponding to the silver image forms in layer (2), and
      (c) separating the two layers and removing the areas from layer (2) that contain no addition polymer image.

13. An unexposed, image-forming element comprising a sheet support bearing on its surface a layer comprising
   (1) a non-gaseous, addition polymerizable ethylenically unsaturated compound containing at least one terminal ethylenic group,
   (2) a metal salt oxidation catalyst free from oxygen-to-oxygen bonds, relatively stable in higher and lower oxidation states and capable of oxidizing metallic silver to silver ions, and
   (3) a radiation-sensitive silver salt.

14. An element according to claim 13 wherein said layer also contains at least one organic polymer binding agent solid at 50° C.

15. An element according to claim 13 wherein said layer also contains a peroxygen compound addition polymerization initiator.

16. An element according to claim 13 wherein said unsaturated compound is a color former.

17. An element according to claim 13 wherein said catalyst is a water-soluble ferric salt.

18. An element according to claim 13 wherein said catalyst is a water-soluble cupric salt.

19. An element according to claim 13 wherein said catalyst is a water-soluble ceric salt.

References Cited by the Examiner

UNITED STATES PATENTS

| 3,019,104 | 1/1962 | Oster | 96—29 |
| 3,029,145 | 4/1962 | Dumers et al. | 96—29 |
| 3,031,301 | 4/1962 | Agens | 96—27 |
| 3,038,800 | 6/1962 | Luckey et al. | 96—35 |
| 3,060,022 | 10/1962 | Duerr | 96—28 |
| 3,073,699 | 1/1963 | Firestine | 96—35 |

References Cited by the Applicant

UNITED STATES PATENTS

| 2,473,548 | 6/1949 | Smith. |
| 2,473,549 | 6/1949 | Smith. |
| 3,101,270 | 8/1963 | Evans et al. |

FOREIGN PATENTS 582,912  10/1959  Belgium.

NORMAN G. TORCHIN, *Primary Examiner.*